Patented Jan. 7, 1936

2,026,565

UNITED STATES PATENT OFFICE 2,026,565

FREE CUTTING ALLOYS

Louis W. Kempf and Walter A. Dean, Cleveland, Ohio, assignors to Aluminum Company of America, Pittsburgh, Pa., a corporation of Pennsylvania No Drawing. Application May 3, 1935, Serial No. 19,616

3 Claims. (Cl. 75—1)

This invention relates to aluminum base alloys and it is particularly concerned with those alloys containing silicon as a major alloy component.

This application is a continuation-in-part of our co-pending application, Serial No. 689,880, filed September 18, 1933. Alloys disclosed but not claimed herein are claimed in our above-mentioned co-pending application, Serial No. 689,880, and in our co-pending applications Serial Nos. 19,607; 19,608; 19,609; 19,610; 19,611; 19,612; 19,613, 19,614, and 19,615, filed May 3, 1935.

Aluminum base alloys containing from about 3 to 15 per cent of silicon have been widely used in cast, extruded and wrought forms because of such desirable casting characteristics as fluidity and low solidification shrinkage of the molten alloy, combined with a good workability of the solid metal if a wrought article is to be made. The alloys also possess a low coefficient of thermal expansion and satisfactory physical properties, particularly tensile strength and elongation. In spite of these advantageous properties, the field of utility of these alloys has been restricted because of their inherently poor machining quality and consequent increased cost of finishing articles of these alloys by machining operations such as boring, drilling, shaping, planing, or lathe-cutting. Difficulty in machining is made evident through an excessive cutting-tool wear which necessitates a frequent resharpening. Poor machinability is also manifested in a rough irregular machined surface and the tendency to form long chips that may foul the cutting tool or operating parts of the machine. Aluminum-silicon alloys are furthermore quite likely to have hard particles of elementary silicon distributed throughout the alloy matrix which seriously interfere with smooth cutting of the article being machined. These difficulties are most readily apparent in machining operations conducted on a large scale such as the manufacture of pistons for internal combustion engines where it has been found desirable to use an expensive cutting tool material to insure long tool life and a satisfactory machined surface.

It is accordingly one of the objects of our invention to make aluminum-silicon alloys amenable to machining operations on a large scale without encountering the disadvantages hereinbefore referred to. A specific purpose is to diminish the irregularity in cut caused by the hard silicon particles and to produce a smooth pleasing surface on the machined article. A further object is to accomplish the foregoing ends without disadvantageously affecting the physical properties of the alloy.

Our invention is predicated upon the discovery that the addition of lead and/or thallium to aluminum-silicon alloys containing from about 3 to 15 per cent silicon greatly improves the machining quality of this type of aluminum alloy. The improvement is especially marked in those alloys containing from about 10 to 15 per cent of silicon which have heretofore been particularly difficult to machine. We have found that the addition of from about 0.05 to 10 per cent of lead and/or thallium to aluminum-silicon alloys imparts a machinability to the alloy which renders it adaptable to all ordinary machining requirements. For the purpose of our invention, lead and thallium are substantially equivalent and are considered to constitute a class of elements with respect to their effect upon the machining quality of aluminum-silicon alloys.

The improvement in machining characteristics referred to above may be brought about by the addition of between about 0.05 and 10 per cent of lead or thallium to aluminum base alloys containing from about 3 to 15 per cent silicon, but for many applications we prefer to use between about 1 and 5 per cent of either lead or thallium. The effect on machinability of these added elements is manifested by the smooth flow of chips from the article being machined, the short breakable chips that are produced, the absence of galling or unevenness of cut, resulting in an irregular surface of dull appearance, and the increase in cutting speed which is possible under such favorable conditions. As an example of an alloy possessing these properties the following composition may be cited: 12 per cent silicon, 4 per cent lead, balance substantially all aluminum.

Lead and thallium may not only be successfully used in binary aluminum-silicon alloys, but also in alloys containing copper, magnesium, manganese and the like in addition to the silicon. The action of lead and thallium in improving the machinability of such alloys appears to be substantially independent of the other alloying ingredients added to alter the character of the basic aluminum-silicon alloy. As an illustration of the benefit derived from the use of lead or thallium in alloys of this nature, the case of an alloy used in the manufacture of pistons for internal combustion engines may be cited. An alloy containing about 12.5 per cent of silicon, 1 per cent of magnesium, 0.8 per cent of nickel, and 0.8 per cent of copper, balance aluminum, had greatly improved machining quality after the addition of about 3 per cent of lead as compared to the same alloy containing no lead. Another example of the beneficial effect of lead on the machining characteristics of aluminum-silicon base alloys is found in an alloy containing about 5 per cent silicon, 0.7 per cent copper, and 0.3 per cent magnesium, the balance being aluminum. This alloy in cast form may be used for making cylinder heads for certain types of internal combustion engines. It is desirable that such a casting be readily machinable without diminishing the strength at ordinary or elevated temperatures. We have found that the addition of about 2.25 per cent of lead produces a marked improvement in machining quality without impairing any of the other desired properties of the alloy.

Lead and thallium may not only be used separately in alloys of the type herein disclosed, but they may be effectively employed in combination in certain applications. The two elements frequently co-act in an aluminum-silicon alloy to produce a degree of machinability not attained by an equivalent amount of either element alone. When so used in combination the total amount should not exceed 10 per cent and preferably less than 5 per cent is recommended. The relative proportions of the two elements may be varied but approximately equal amounts of them generally give satisfactory results.

For certain applications it has been found desirable to add other elements than lead and thallium which also serve to improve the machining quality of the alloys disclosed herein. The elements cadmium and bismuth belong to this group. A commercially useful group of alloys have been made up from compositions within the following range, silicon 3 to 15 per cent, copper 0.1 to 5.0 per cent, magnesium 0.1 to 1.5 per cent, and one or more of the elements lead, bismuth, cadmium, or thallium, in amounts respectively as follows, lead 0.05 to 10 per cent, bismuth 1.5 to 6 per cent, cadmium 1.5 to 6 per cent, and thallium 0.05 to 10.0 per cent. We have tested cast samples for tensile strength, per cent elongation and machining quality, on specific alloys within the above range, including the following alloys which may be regarded as representative.

(1) An aluminum base alloy containing 5.0 per cent silicon, 1.2 per cent copper, 0.5 per cent magnesium and 4.0 per cent lead, the balance being aluminum.

(2) An aluminum base alloy containing 5.0 per cent silicon, 1.2 per cent copper, 0.5 per cent magnesium and 4.0 per cent bismuth, the balance being aluminum.

(3) An aluminum base alloy containing 5.0 per cent silicon, 1.2 per cent copper, 0.5 per cent magnesium, and 4.0 per cent cadmium, the balance being aluminum.

(4) An aluminum base alloy containing 5.0 per cent silicon, 1.2 per cent copper, 0.5 per cent magnesium, 2.0 per cent lead and 2.0 per cent bismuth, the balance being aluminum.

(5) An aluminum base alloy containing 5.0 per cent silicon, 1.2 per cent copper, 0.5 per cent magnesium, 2.0 per cent lead and 2.0 per cent cadmium, the balance being aluminum.

(6) An aluminum base alloy containing 5.0 per cent silicon, 1.2 per cent copper, 0.5 per cent magnesium, 2.0 per cent bismuth and 2.0 per cent cadmium, the balance being aluminum.

(7) An aluminum base alloy containing 5.0 per cent silicon, 1.2 per cent copper, 0.5 per cent magnesium, 1.3 per cent lead, 1.3 per cent bismuth and 1.3 per cent cadmium, the balance being aluminum.

We have found that the above addition of lead, bismuth, or cadmium markedly improves the machining properties of the aluminum-silicon-copper-magnesium alloy without materially affecting the tensile strength or elongation. As in the case of alloys discussed hereinabove, we have also found that combinations of more than one of the free machining elements lead, cadmium, bismuth, or thallium cause a greater improvement in machining properties than the same total amount of only one free machining element. By this we mean, as a specific example, that alloys 4, 5, 6, and 7 immediately above, are superior in machining properties to alloys 1, 2, and 3, although in all cases the total amount of free machining constituent is 4 per cent.

If total quantities of free machining constituents are larger than about 5 per cent, there is a decrease in tensile strength, but the machinability is improved, which serves to compensate for the decrease in strength. In any event, the total amount of free machining elements should preferably not exceed about 10 per cent.

The lead and thallium may be most conveniently added to the molten aluminum-silicon alloy in solid metallic form. Other methods of making alloy additions practiced by those skilled in the art yield equally satisfactory results. If the amount of lead and thallium to be added exceeds about 1.5 per cent, the melt should be heated somewhat above ordinary temperatures and vigorously stirred to assure a uniform mixture. The method of adding lead and thallium to aluminum and its alloys here referred to is more fully described in co-pending application, Serial No. 689,885 now Patent No. 1,959,029, granted May 15, 1934.

The term "aluminum" used herein and in the appended claims embraces the usual impurities found in aluminum ingot of commercial grade, or picked up in the course of the usual handling operations incident to ordinary melting practice.

The alloys herein disclosed may be subjected to the usual thermal treatments familiar to those skilled in the art for the purpose of improving or altering their physical characteristics.

We claim:

1. An aluminum base alloy containing about 3 to 15 per cent silicon, about 0.1 to 5 per cent copper, about 0.1 to 1.5 per cent of magnesium, about 0.05 to 10 per cent of lead, about 1.5 to 6 per cent of bismuth, and about 1.5 to 6 per cent of cadmium, the total amount of lead, bismuth and cadmium being not in excess of 10 per cent, the balance being aluminum.

2. An aluminum base alloy containing about 5.0 per cent of silicon, about 1.2 per cent of copper, about 0.5 per cent of magnesium, about 1.3 per cent of lead, about 1.3 per cent of bismuth and about 1.3 per cent of cadmium, the balance being aluminum.

3. An aluminum base alloy containing about 10 to 15 per cent of silicon, about 0.1 to 5 per cent of copper, about 0.1 to 1.5 per cent of magnesium, about 1 to 5 per cent of lead, about 1.5 to 6 per cent of bismuth, and about 1.5 to 6 per cent of cadmium, the total amount of lead, bismuth and cadmium being not in excess of 10 per cent, the balance being aluminum.

LOUIS W. KEMPF.
WALTER A. DEAN.